United States Patent
Koyasu

(10) Patent No.: US 6,846,997 B2
(45) Date of Patent: Jan. 25, 2005

(54) CONTACT STRUCTURE OF COMBINATION SWITCH

(75) Inventor: Ryo Koyasu, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/367,879

(22) Filed: Feb. 19, 2003

(65) Prior Publication Data

US 2004/0003988 A1 Jan. 8, 2004

(30) Foreign Application Priority Data

Feb. 18, 2002 (JP) ........................................ 2002-040520

(51) Int. Cl.[7] .............................................. H01H 9/00
(52) U.S. Cl. .................................. 200/292; 200/61.54
(58) Field of Search .............................. 200/61.54, 18, 200/61.28, 17 R, 61.31, 292.4, 61.27

(56) References Cited

U.S. PATENT DOCUMENTS

| | | | | |
|---|---|---|---|---|
| 4,329,039 A | * | 5/1982 | Kaneko | 396/502 |
| 4,370,529 A | * | 1/1983 | Loose | 200/16 D |
| 4,871,885 A | * | 10/1989 | Kamada | 200/5 R |
| 6,069,332 A | * | 5/2000 | Suchanek et al. | 200/293 |

* cited by examiner

Primary Examiner—Elvin Enad
Assistant Examiner—Lisa Klaus
(74) Attorney, Agent, or Firm—Sughrue Mion, PLLC

(57) ABSTRACT

A contact structure of a combination switch, includes a contact board, a fixed contact piece, a fixed contact and a plurality of moving contacts. The fixed contact piece for being supplied with a large current is provided on the contact board. The fixed contact for being supplied with a small current, is provided as part of a wiring formed on the contact board. The plurality of moving contacts slide over the contact board such that the fixed contact piece and the fixed contact are respectively brought into contact with the moving contacts.

5 Claims, 4 Drawing Sheets

CONTACT STRUCTURE OF COMBINATION SWITCH

BACKGROUND OF THE INVENTION

This invention relates to a contact structure of a combination switch for effecting operations such as the lighting of headlamps of a vehicle, the lighting of turn signal lamps and the driving of wipers.

A related combination switch is shown in FIGS. 3 and 4. As shown in FIGS. 3 and 4, this combination switch 1' is provided with an operating lever 2', projected from a steering column (not shown), and includes a plurality of switches 3, 4, 5 and 6 which can be switched by various kinds operations of the operating lever 2'. Each of these switches 3, 4, 5 and 6 includes a moving contact 8 mounted on a contact holding member 7, and a fixed contact 10 provided on a contact board 9.

As shown in FIGS. 3 and 4, the moving contact 8 is urged toward the fixed contact 10 by a spring force of a spring 11 which is provided between the moving contact 8 and the contact holding member 7. The moving contact 8 is slid over the contact board 9 which includes the fixed contacts 10 by operating the operating lever 2'. Each fixed contact 10 is formed, using a part of an associated bus bar insert molded in the contact board 9. Namely, the contact board 9 is formed by insert molding the bus bars (products formed by pressing) in a resin, and circuit wiring, the fixed contacts 10, a connector portion and so on are formed by the bus bars. In the drawings, reference numeral 12 denotes an under cover.

However, in the contact structure of the above related combination switch 1', the fixed contacts 10 are formed, using the bus bars insert molded in the contact board 9, and therefore the contact structure of the combination switch 1' is complicated, large in size and high in cost. Namely, the bus bars are thick and wide, and since such bus bars are insert molded, the contact board 9 has a large size. In the case where a large amount of circuit wiring is installed in the contact board 9, the contact board 9 must be divided into two board part members 9a and 9b as in the above related example, and the two board part members 9a and 9b are combined together, and as a result the overall structure becomes more complicated and larger in size.

And besides, the bus bars themselves are costly, and also the insert molding is costly, and therefore the cost further increases. Furthermore, in the case where the contact board 9 is formed by the two board part members 9a and 9b as described above, such two insert molded products must be prepared and combined together, so that the cost further increases.

SUMMARY OF THE INVENTION

It is therefore an object of the present invention to provide a contact structure of a combination switch which can be made simple and compact in overall construction, and can be produced at low costs.

In order to achieve the above object, according to the present invention, there is provided a contact structure of a combination switch comprising;

a contact board;

a fixed contact piece, supplied with a large current, provided on the contact board;

a fixed contact, supplied with a small current, provided as part of a wiring formed on the contact board;

a plurality of moving contacts, which slide over the contact board such that the fixed contact piece and the fixed contact are respectively brought into contact with the moving contacts.

Preferably, the fixed contact is comprised of high insulating material.

In the configuration, a space, required for forming the fixed contact, can be made much smaller as compared with the related construction, and besides the costs, required for forming the fixed contact piece and the fixed contact, are much lower as compared with the related construction, so that the contact structure of the combination switch can be made simple and compact in overall construction, and can be produced at low costs.

Preferably, the fixed contact piece is electrically connected to a connector portion via the wiring.

In the above configuration, the electrical connection between the fixed contact piece and the connector portion is effected, using the wiring pattern on the contact board, therefore the electrically-connecting operation can be effected in a simplified manner at low costs.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

One embodiment of the present invention will now be described with reference to the drawings.

Figure 1:
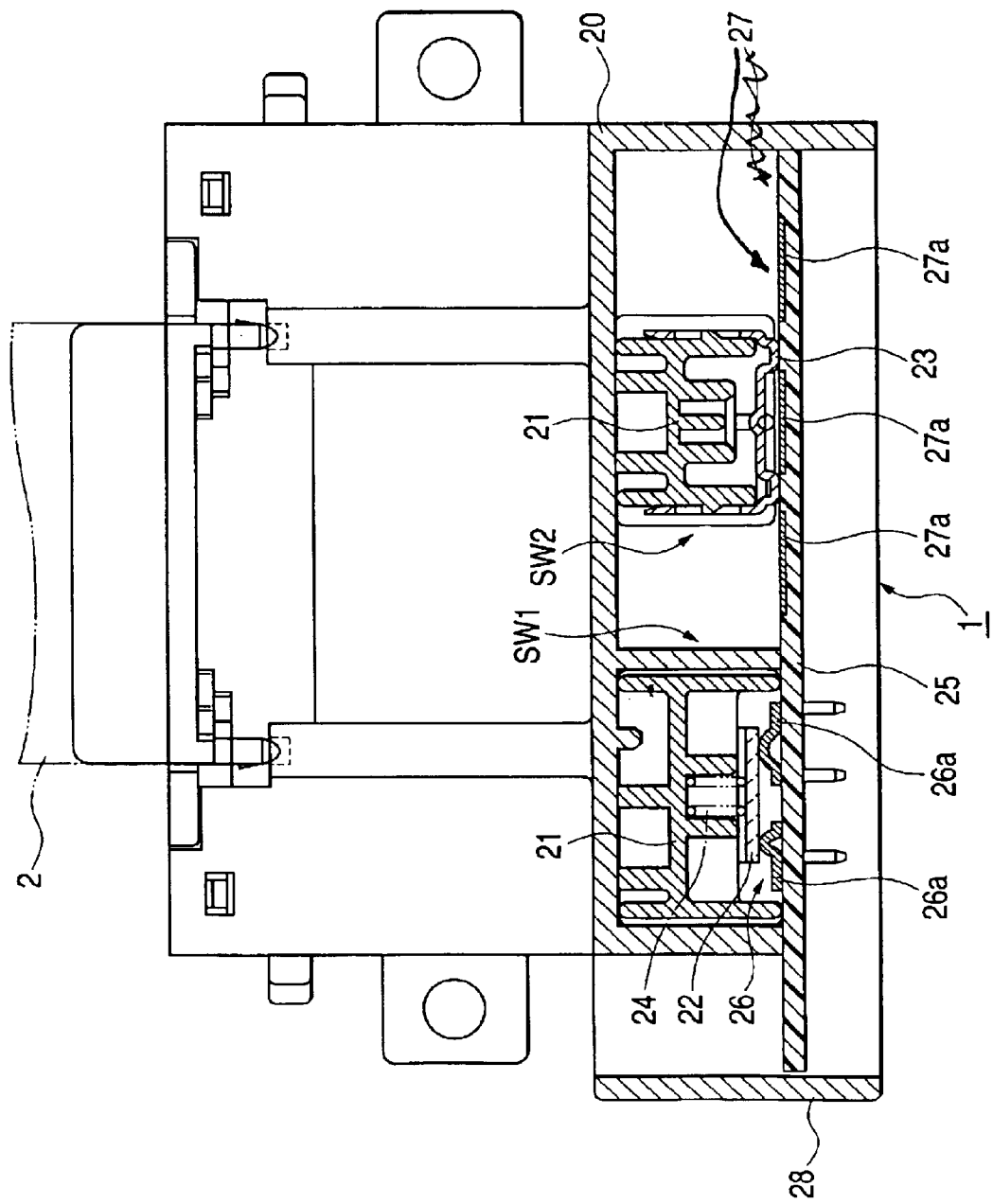
FIG. 1 shows one embodiment of the present invention, and is a cross-sectional view of an important portion of a contact structure of a combination switch.
Figure 2:
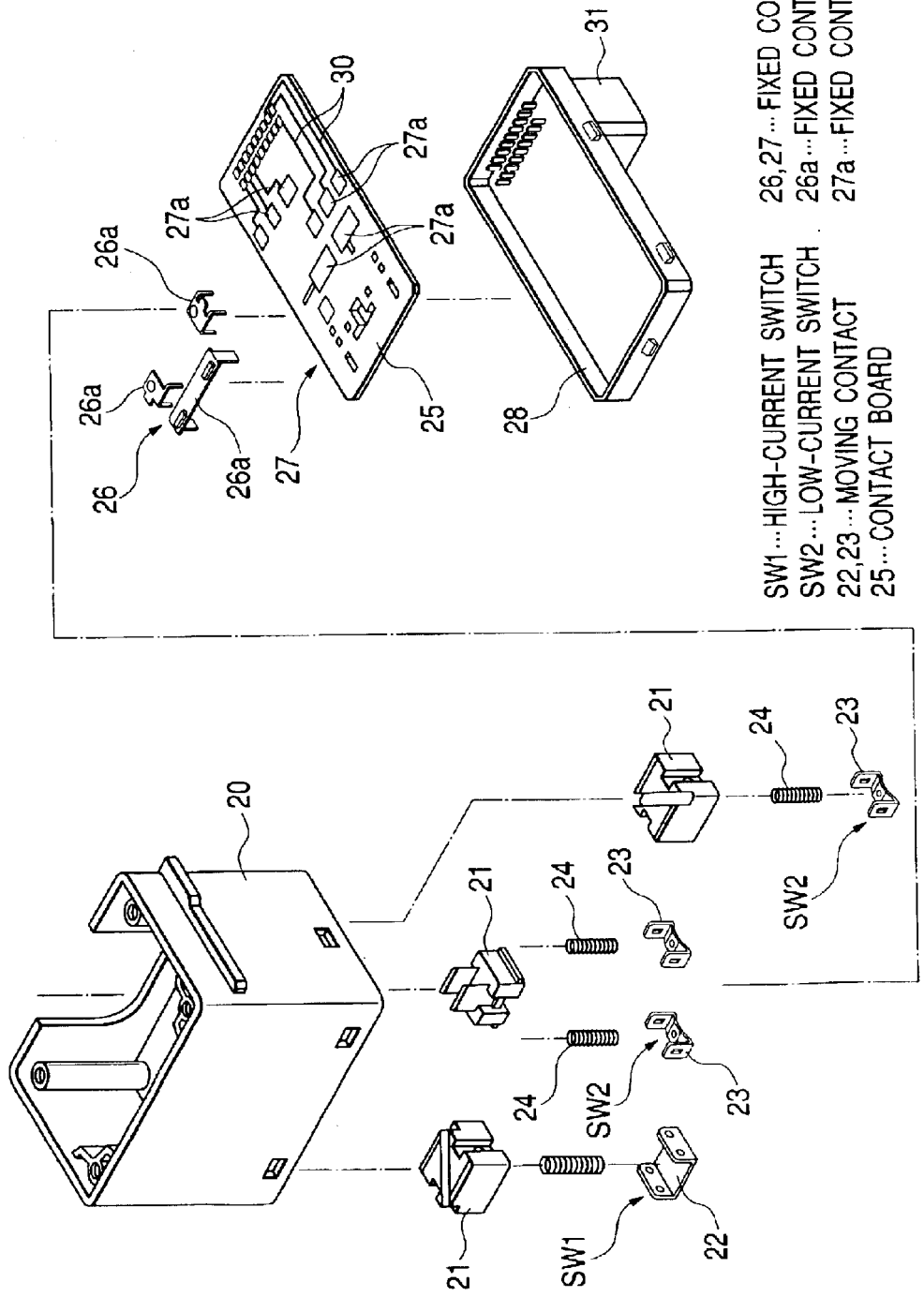
FIG. 2 shows the one embodiment of the invention, and is an exploded, perspective view of an important portion of the contact structure of the combination switch.
Figure 3:
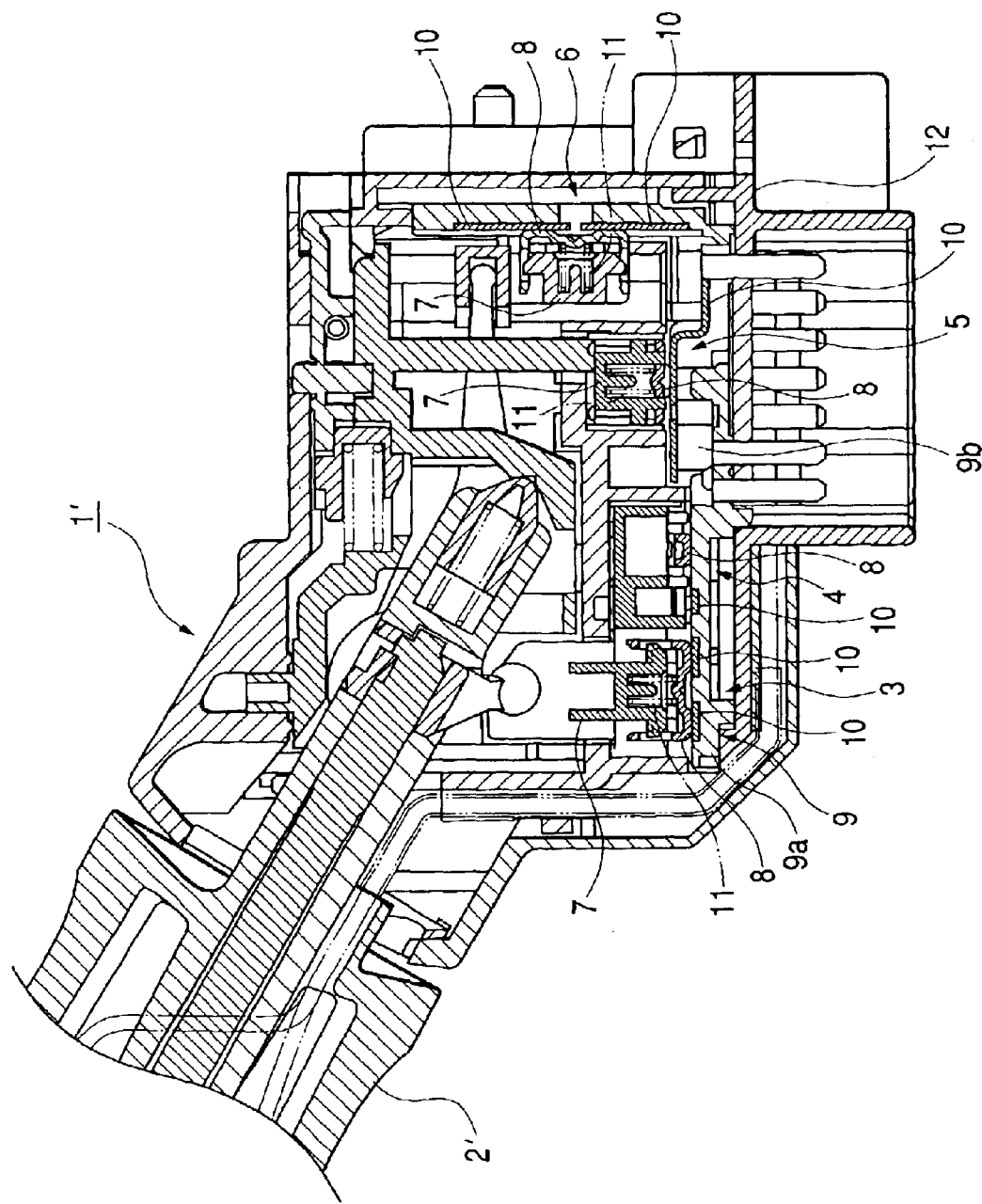
FIG. 3 shows a cross-sectional view of an important portion of a related contact structure of a combination switch.
Figure 4:
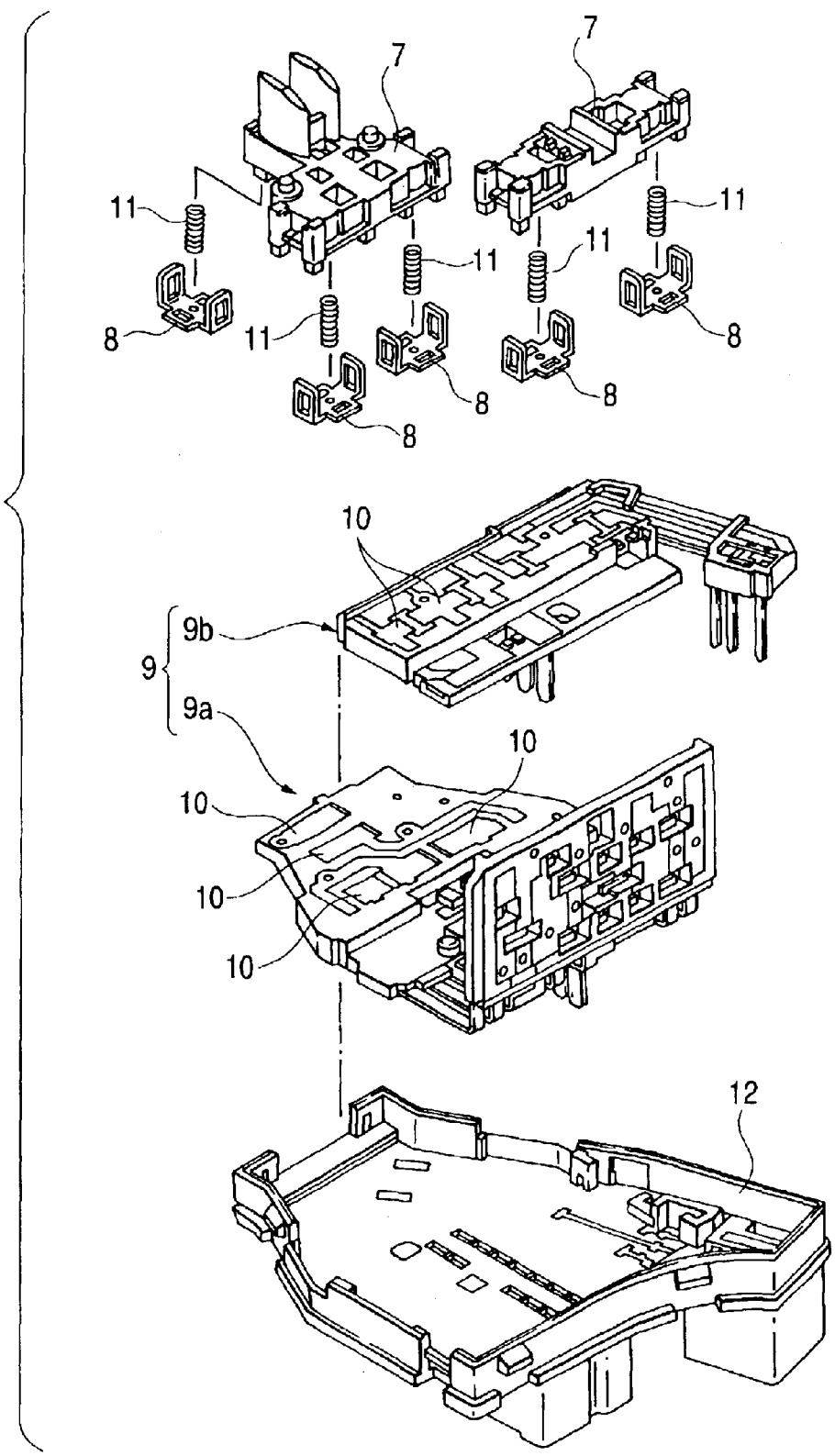
FIG. 4 shows an exploded, perspective view of an important portion of the related contact structure of the combination switch.

FIGS. 1 and 2 show one embodiment of the invention, and FIG. 1 is a cross-sectional view of an important portion of a contact structure of a combination switch, and FIG. 2 is an exploded, perspective view thereof.

As shown in FIGS. 1 and 2, a plurality of contact holding members 21 are provided within a housing 20 of the combination switch 1, and these contact holding members 21 are moved respectively in predetermined directions by various kinds of operations of an operating lever 2. Moving contacts 22 and 23 of a plurality of switches SW1 and SW2 are mounted on the respective contact holding members 21, and each moving contact 22, 23 is urged toward a corresponding fixed contact 26, 27 on a contact board 25 by a spring force of a compression coil spring (urging member) 24 provided between the moving contact and the associated contact holding member 21.

The contact board 25 is fixed to the housing 20 through an under cover 28, and the fixed contacts 26 and 27 of the plurality of switches SW1 and SW2 are provided on the contact board 25. For example, the plurality of switches SW1 and SW2 are provided as a cornering signal switch, a dimmer switch, a passing light switch, a turn signal switch and so on, and these switches include a high-current switch (direct controlled switch) SW1 for being supplied with a large current so as to directly drive an upper-level load (such as a lamp and a motor), and low-current switches (very small-current switches) SW2 for being supplied only with a very small current so as to output a control current to an electronic control unit.

The fixed contact 26 of the high-current switch SW1 is formed by a plurality of fixed contact piece members 26a fixedly mounted on the contact board 25. The fixed contact 27 of the low-current switch SW2 is formed by fixed contact patterns 27a which are part of wiring patterns 30 formed on the contact board 25. Each fixed contact piece member 26a is an electrically-conductive member which is thick, and exhibits a high resistance to wear due to an arc, and is fixedly secured to the contact board 25 by soldering or the like. Each wiring pattern 30 (including the fixed contact pattern 27a) is an electrically-conductive member which is thin, and exhibits a low resistance to wear due to an arc, and is formed by forming an electrically-conductive material on the board by printing, vapor deposition or others.

The fixed contact patterns 27a are electrically connected to a connector portion 31 via the associated wiring patterns 30 on the contact board 25. The fixed contact piece members 26a are also electrically connected to the connector portion 31 via the associated wiring patterns 30 formed on the contact board 25.

In the above construction, when the operating lever 2 is operated, the selected moving contact 22, 23 is slid over the contact board 25 including the fixed contacts 26 and 27. The moving contact 22, 23 is brought into and out of contact with the corresponding fixed contact 26, 27, thus effecting the switching operation. Here, a large current is supplied to the high-current switch SWI, and therefore there is a possibility that an arc discharge develops when the moving contact 22 Is moved out of contact with the associated fixed contact piece member 26a. However, each fixed contact piece member 26a is comprised of the material which exhibits a high resistance to wear due to an arc, and therefore adverse effects due to such arc wear will not occur.

Since only a very small current is supplied to each low-current switch SW2, an arc discharge will not develop at the fixed contact pattern 27a, and therefore although the fixed contact pattern 27a is comprised of the material which exhibits a low resistance to wear due to an arc, adverse effects due to such arc wear will not occur.

As described above, in the contact structure of the combination switch 1, the fixed contact 26, formed on the contact board 25, is formed by the fixed contact piece members 26a fixedly mounted on the contact board 25, while the fixed contact 27, formed on the contact board 25, is formed by the fixed contact patterns 27a which are part of the wiring patterns 30 formed on the contact board 25. Therefore, a space, required for forming the fixed contacts 26 and 27, can be made much smaller as compared with the related construction, and besides the costs, required for forming the fixed contact piece members 26a and the fixed contact patterns 27a, are much lower as compared with the related construction, so that the contact structure of the combination switch 1 can be made simple and compact in overall construction, and can be produced at low costs.

In this embodiment, the fixed contact piece members 26a are electrically connected to the connector portion 31 via the wiring patterns 30 formed on the contact board 25, and therefore the electrical connection of the fixed contact piece members 26a to the connector portion 31 is effected, using the wiring patterns 30 on the contact board 25, and therefore this electrically-connecting operation can be effected in a simplified manner at low costs.

What is claimed is:

1. A contact structure of a combination switch, comprising:
    a contact board;
    a fixed contact piece, supplied with a large current, provided on the contact board;
    a fixed contact, supplied with a small current, provided as part of a wiring formed on the contact board;
    a plurality of moving contacts, which slide over the contact board such that the fixed contact piece and the fixed contact are respectively brought into contact with the moving contacts.

2. The contact structure, as set forth in claim 1, wherein the fixed contact piece is electrically connected to a connector portion via the wiring.

3. The contact structure, as set forth in claim 1, wherein the fixed contact exhibits a lower resistance to wear due to an arc than the fixed contact piece.

4. The contact structure as set forth in claim 1, wherein said fixed contact piece is soldered to the contact board.

5. The contact structure as set forth in claim 1, wherein said fixed contact is a thin electrically-conductive member.

* * * * *